Patented June 27, 1950

2,513,122

UNITED STATES PATENT OFFICE 2,513,122

WATER SET PRINTING INKS

Andries Voet, New York, N. Y., assignor to J. M. Huber Corporation, New York, N. Y., a corporation of New Jersey No Drawing. Application April 19, 1947, Serial No. 742,748

10 Claims. (Cl. 106—30)

This invention relates to printing inks and more particularly to inks which may be set by the application of water.

Various inks of the water set type have become known in the printing art. In general, they comprise varnishes into which pigments and perhaps other modifying agents are incorporated, which are composed essentially of certain water-insoluble resins dissolved in water-soluble solvents so that the resin precipitates as a binder for the pigments upon the application of water in liquid or vapor form to films of the ink. Among the resins heretofore considered most suitable for such inks are products of the modification of rosin by means of Diehls-Alder types of reactions with alpha-beta unsaturated organic acids, and certain alkyd and phenol-formaldehyde resins.

These known water set inks have not been entirely satisfactory for several reasons. One difficulty has been due to the highly acidic nature of the resins employed, which corrode parts of printing presses and in some ink formulations alter the color values of necessary acid-sensitive pigments. Another and the most common and troublesome problem has resulted from the very limited water tolerance of these inks. This has caused them to deposit resin upon any extended contact with air of increased humidity, with the result that solids precipitated on working parts of the printing presses during normal intervals of stoppage of their operation.

It is the main purpose of this invention to provide new and improved water set printing inks and printing ink varnishes which have an increased water tolerance such that the inks may be used conveniently and efficiently on printing presses operated in normal ways, without trouble from precipitation of solids during normal periods of stoppage of the presses. Another object is to provide such improved water set inks which are relatively non-corrosive to printing presses. And a further object is to provide improved water set printing inks and ways of compounding them whereby the water tolerance and precipitation qualities of the inks can be regulated to suit variations of humidity conditions.

I have discovered that these purposes can be achieved by the use as a binder of the combination of beta naphthol pitch with a rosin, such as gum rosin, wood rosin or the aliphatic-hydrocarbon-insoluble portion of wood rosin, and dissolving this binder in a water-soluble solvent to form a varnish or vehicle into which pigments are incorporated with or without minor amounts of usual printing ink modifying agents.

Rosin or rosin fractions in chemically unmodified form have not been considered useful heretofore as constituents of water-set printing inks, and the water tolerance of inks made with rosin solutions is quite low. The water tolerance of inks made with solutions of beta naphthol pitch is relatively quite high and generally so high that the pitch is not precipitated satisfactorily by the application of steam to printed films of such inks. I have found, however, that when these substances are both present in the same solution as a product of heating the two substances together, the resulting resin no longer responds in a proportional manner to the addition of water. Solutions which contain relatively large amounts of a rosin and which normally deposit the rosin upon the addition of a relatively small amount of water may be made to tolerate several times this amount of water if beta naphthol pitch is also present in the heat-combined form, even though it be but a minor component of the binder. In the use of such a combination, both the rosin and the beta naphthol pitch appear to be precipitated together by an amount of water intermediate the amounts required to precipitate the respective substances separately. This amount, however, is not in direct proportion to the quantity of the pitch in the dissolved binder, which suggests that the two substances are associated chemically in common solutions as used pursuant hereto.

According to the preferred embodiments of this invention a combination of from 75 to 25% of a rosin with from 25 to 75% of beta naphthol pitch is used as the binder of the inks. This is dissolved in a liquid polyalkylene glycol or a mixture of such glycols; and upon the incorporation of pigments in the resulting solution, water set printing inks are obtained which exhibit an extraordinarily valuable combination of qualities. These inks show the required tolerance of atmospheric water (press stability), good flow and printing qualities on printing presses, and non-corrosiveness, and printed films of the inks set quickly upon the application of water thereto in either vapor or liquid form.

Beta naphthol pitch is a known resinous substance which is obtained as the solid residue of the distillation or final purification of beta naphthol. Its preparation is described in Groggin's "Unit Processes in Organic Synthesis" (New York, 1935) at pages 569 to 570. In summary: naphthalene is sulfonated; the small proportion of alpha sulfonic acid is de-sulfonated by introducing steam; the free beta naphthalene sulfonic acid is neutralized and the resulting sodium naphthalene sulfonate is fused with caustic soda; the sodium naphtholate formed is dissolved and treated with dilute sulfuric acid, yielding a precipitate of crude beta naphthol; the crude beta naphthol is then dried and transferred to a still, where it is distilled first at about 200° C. without vacuum and later at about 248° C. under vacuum. The pure beta naphthol distills over into zinc lined boxes, leaving behind as a residue the pitch here employed.

This pitch has a dark color and an undetermined composition. It usually melts at about 160 to 180° F., and it has a slight naphtholic odor, is partly soluble in caustic soda solutions, and is entirely soluble in lower alcohols, acetone and polyglycols. It is insoluble in hydrocarbons and in water. The physical qualities of the commercial products, however, vary to some extent, most likely as a result of the varying temperatures and periods of time used in the distillation of the crude beta naphthol. Most important is the fact that the water tolerance of different batches of beta naphthol pitch, when dissolved in a water miscible solvent, is not constant but has been found to vary as much as 40 per cent.

The rosins employed according to this invention, like the beta naphthol pitch, are water-insoluble and alcohol-soluble. They are the natural rosins obtained by purification or solvent extraction of the exudations of pine trees, including gum rosin, wood rosin, the aliphatic-hydrocarbon-insoluble portion of wood rosin known as "Vinsol," and the like. Any of these rosins or any mixture of them can be used and is referred to herein as a rosin. These rosins not only give valuable qualities in combination with beta naphthol pitch, but in addition they are relatively inexpensive and relatively easy to compound into the improved inks.

The solvents to be used comprise relatively non-volatile water-soluble organic liquids which dissolve the resinous binder substances and are sufficiently stable at temperatures of 250 to 300° F. used in preparing the inks. Thus, glycol and its various liquid derivatives such as glycol ethers or liquid polyglycols may be used, while the solvents found most satisfactory and preferred for the purpose are liquid polyalkylene glycols, such as diethylene glycol, dipropylene glycol, tetraethylene glycol, 2 methyl 2-4 pentane diol, and mixtures thereof.

Useful modifying agents include the well known pigment toners and various waxy materials, such as paraffin wax, beeswax and various grades of "Carbowax," as well as triethanolamine, stearyl alcohol, and the like, which may be incorporated in the varnish of the finished ink. The "Carbowax" products are solid polyalkylene glycols of high molecular weight and are particularly desirable modifiers for varying water tolerance and other qualities in the preferred inks wherein liquid polyalkylene glycols are used as the solvent.

According to some embodiments of this invention valuable water set printing inks are made by dispersing coloring matter such as pigments in a varnish composed essentially of a product of the co-heating of beta naphthol pitch and a rosin, such as gum rosin or wood rosin, dissolved in liquid polyalkylene glycol. According to other embodiments, the aliphatic-hydrocarbon-insoluble portion of wood rosin, such as "Vinsol" rosin, is used in lieu of gum rosin or wood rosin in the essential binder substance. In either such case inks of desired consistency having desirable printing and setting qualities may be obtained with various ratios of binder to solvent, and the relative amounts of beta naphthol pitch and rosin may be varied widely, with good results, within the range in which the rosin content is from 75% to 25% of the combined resins. With dipropylene glycol as the solvent, the most desirable inks are obtained when from 75 to 40% of "Vinsol" is used with beta naphthol pitch as substantially the remainder of the binder, while in the case of diethylene glycol as the solvent the corresponding preferred limits are about 60 to 25% of "Vinsol" with about 40 to 75% of the pitch.

The varnishes provided herein may be prepared by mixing a rosin and beta naphthol pitch in the desired proportions, heating the mixture to its fusion temperature, and afterwards dissolving the resulting product in the desired water-soluble solvent therefor. Another suitable practice is to add the desired quantities of beta naphthol pitch and rosin separately to the water-soluble solvent and heat the mixture sufficiently to bring the resinous substances entirely into solution and combine them into the desired water-tolerant product. In either practice this product results at a temperature above the melting points of the rosin and the beta naphthol pitch. The finished printing inks are obtained by incorporating the desired pigments and modifying agents into the varnishes either during or subsequent to their preparation. This may be followed by grinding the ink to assure complete dispersion of its components.

The water tolerance of inks embodying this invention can be regulated to a large degree by varying the relative proportions of the beta naphthol pitch and the rosin employed together in the binder.

In order to illustrate the effects of different proportions of the resinous substances upon water tolerance, varnishes were prepared in which the binder was composed of beta naphthol pitch combined with various proportions of gum rosin. In other varnishes various proportions of "Vinsol" rosin were used with the beta naphthol pitch. In all cases the varnish was composed of equal weights of binder and diethylene glycol, and the water tolerance of the resulting varnish was determined by a standardized test as follows: To 100 cubic centimeters of the varnish water was added drop by drop, with good agitation, until the first indication of precipitation occurred. The water tolerance was recorded as the volume of water in cubic centimeters required to initiate precipitation of the binder, which volume experience shows to be usually determinable to an accuracy within 0.2 cubic centimeter.

The following tabulation of results shows that the water tolerance of the varnish, hence of printing inks made with the varnish, can be easily varied in a controlled manner:

| per cent "Vinsol" rosin in binder | per cent gum rosin in binder | per cent beta naphthol pitch in binder | water tolerance of varnish in cc. |
|---|---|---|---|
| 0 | 0 | 100 | 17.0 |
| 25 | 0 | 75 | 15.4 |
| 50 | 0 | 50 | 13.6 |
| 75 | 0 | 25 | 11.0 |
| 100 | 0 | 0 | 6.0 |
| 25 | 25 | 50 | 10.2 |
| 0 | 25 | 75 | 10.4 |
| 0 | 50 | 50 | 6.0 |
| 0 | 75 | 25 | 2.6 |
| 0 | 100 | 0 | .2 |

The water tolerance of water set ink varnishes under average conditions of temperature and humidity should be between 8–15 cc. of water per 100 cc. of varnish, as determined in the manner described above. Where the beta naphthol pitches obtained commercially show marked variations in water tolerance, it is easy to standardize the water tolerance of varnishes made with them, to bring it within the desired range, by varying the relative quantities of beta naphthol pitch and rosin, according to the properties of the particular batch of pitch employed.

Such a procedure makes it possible to make a printing ink of the required water tolerance for each particular use, regardless of the variations in properties found in various batches of beta naphthol pitches made by different manufacturers or even by the same manufacturer.

The following examples further illustrate the preparation of various water set printing inks and printing ink varnishes embodying this invention:

Example I

A varnish was prepared by heating 50 parts of diethylene glycol to 300° F. and adding 30 parts of beta naphthol pitch and 20 parts of D rosin (a gum rosin having color "D" on the U. S. Rosin Standard Scale, obtained by removing the volatile constituents from the exudation of pine trees). The varnish was cooled, and 27 parts of carbon black, 4.5 parts of milori blue, 3 parts of paraffin wax, 7.5 parts of tetraethylene glycol and 7.5 parts of Carbowax 4000 were stirred in. (Carbowax 4000 is a polyethylene glycol having an average molecular weight of 3350.) The preparation of the ink was completed by grinding on a three-roller ink mill.

The finished ink had a water tolerance of 8.0 cc. An ink otherwise the same, except that the varnish contained 20 parts of beta naphthol pitch with 30 parts of D rosin, had a water tolerance of 4.9 cc., while a water tolerance of 2.1 cc. resulted when using 10 parts of beta naphthol pitch with 40 parts of D rosin.

Example II

The following inks were prepared and tested for water tolerance as above described, the resulting data illustrating the control of water tolerance in inks having a varnish composed of a solution of beta naphthol pitch and "Vinsol" rosin in dipropylene glycol:

| Ink No. | 1 | 2 | 3 | 4 |
|---|---|---|---|---|
| Dipropylene glycol | 50 | 50 | 50 | 50 |
| Beta naphthol pitch | 40 | 30 | 20 | 10 |
| "Vinsol" rosin | 10 | 20 | 30 | 40 |
| Lithol barium toner | 47 | 47 | 47 | 47 |
| Blanc fixe | 19 | 19 | 19 | 19 |
| Paraffin wax | 4 | 4 | 4 | 4 |
| Polyethylene glycol | 9.5 | 9.5 | 9.5 | 9.5 |
| Carbowax 1500 [1] | 9.5 | 9.5 | 9.5 | 9.5 |
| Water tolerance in cc | 14.8 | 13.1 | 10.3 | 8.9 |

[1] A blend of equal weights of polyethylene glycols having average molecular weights of 300 and 1450, respectively, the mixture having an average molecular weight of 875.

Example III

A varnish was made by heating 20 parts of beta naphthol pitch residue, 10 parts "Vinsol" rosin and 20 parts of gum rosin to 250° F. for 20 minutes and slowly stirring into this fused mixture 50 parts of a mixture containing equal parts of diethylene glycol, tetraethylene glycol and dipropylene glycol. The varnish was further compounded while warm with 4 parts of paraffin wax and 8 parts of beeswax. It was then cooled to about 120° F., and 30 parts of milori blue, 25 parts of cadmium yellow, and 10 parts of titanium dioxide were stirred in. The ink was finished on a three-roller ink mill. Its water tolerance was 12 cc.

As the foregoing examples clearly indicate, the present invention provides printing inks having qualities of water tolerance which well satisfy any required balance between the atmospheric humidity likely to exist in the pressroom where the inks are used and the requirements for precipitation of the binder and other solids from printed films of the ink by the addition of water in the form of liquid or steam. Thus, the inks provided by this invention have valuable qualities of stability in use on printing presses, together with the desired quality of setting quickly upon the addition of water to the printed ink films. In addition, these inks are substantially non-corrosive to printing presses by reason of the lack of excessive acidity in the resins employed.

While I have exemplified the practice of this invention by the specification of numerous details and examples, it will be understood that many variations may occur in the preparation of the improved inks and in their ingredients and proportions without departing from the spirit of the invention disclosed and included within the scope of the appended claims. For example, the varnish may be made to contain more or less rosin, according to requirements, and the ink may be prepared either as a finished ink ready for printing or to be diluted with further solvents or otherwise modified before its use on the printing press. Various waxy or liquid modified agents, various solid fillers, and various coloring agents may be employed.

I claim:

1. A printing ink substantially non-corrosive to printing presses that sets upon the addition of water to films of the ink but is stable against atmospheric humidity in use on such presses, comprising a solution in a liquid glycol solvent of a binder consisting essentially of a product of the co-heating of from 1 to 3 parts of a rosin with from 3 to 1 parts of beta naphthol pitch at a temperature above the melting points thereof, said solution having a water tolerance of about 8 to 15 cc. of water per 100 cc. of the solution, and pigments dispersed in said solution.

2. A printing ink as described in claim 1, said solution containing said polyglycol and said binder in approximately equal weights.

3. A water set printing ink composed essentially of a liquid solution in a liquid polyalkylene glycol of a product of the co-heating of from 75% to 25% of a rosin and from 25% to 75% of beta naphthol pitch at a temperature above the melting points thereof, with pigments and a small amount of waxy material dispersed in said solution.

4. A printing ink as described in claim 3, said waxy material comprising normally solid polyalkylene glycol.

5. A printing ink that sets upon the addition of water to films of ink but is stable against atmospheric humidity in use on printing presses, comprising pigments dispersed in a solution in a liquid glycol solvent of a binder consisting essentially of a product of the co-heating of about 75% to 25% of the aliphatic-hydrocarbon-insoluble portion of wood rosin with about 25 to 75% of beta naphthol pitch at a temperature above the melting points thereof, said solution having a water tolerance of about 8 to 15 cc. of water per 100 cc. of the solution.

6. A printing ink which sets upon the application of water to films of the ink but is stable against atmospheric humidity in use on printing presses, comprising pigments dispersed in a solution in dipropylene glycol of a binder consisting essentially of a product of the co-heating of about 75 to 40% of the aliphatic-hydrocarbon-insoluble portion of wood rosin with about 25 to 60% of beta naphthol pitch at a temperature above the melting points thereof, said solution having a water tolerance of about 8 to 15 cc. of water per 100 cc. of the solution.

7. A printing ink that sets upon the application of water to films of the ink but is stable against atmospheric humidity in use on printing presses, comprising pigments dispersed in a solution in a liquid glycol solvent of a binder consisting essentially of a product of the co-heating of about 75 to 25% of gum rosin with about 25 to 75% of beta naphthol pitch at a temperature above the melting points thereof, said solution having a water tolerance of about 8 to 15 cc. of water per 100 cc. of the solution.

8. A printing ink that sets upon the application of water to films of the ink but is stable against atmospheric humidity in use on printing presses, comprising pigments dispersed in a solution in a water solvent of a binder consisting essentially of a product of the co-heating of a rosin and beta naphthol pitch at a temperature above the melting points thereof, said rosin being the major binder component and said pitch being the minor binder component but at least about 25% of the binder, said solution having a water tolerance of about 8 to 15 cc. of water per 100 cc. of the solution.

9. A printing ink as described in claim 8 in which said rosin is the aliphatic-hydrocarbon-insoluble portion of wood rosin.

10. A water-set printing ink composition composed essentially of pigments and modifiers dispersed in a solution in liquid polyalkylene glycol of a resinous binder consisting of a product of the co-heating of from 75 to 25% of a rosin and from 25 to 75% of beta naphthol pitch at a temperature above the melting points thereof.

ANDR. VOET.

REFERENCES CITED

The following references are of record in the file of this patent:

UNITED STATES PATENTS

| Number | Name | Date |
|---|---|---|
| 4,102 | Clark | July 5, 1845 |
| 2,139,242 | Mock | Dec. 6, 1938 |
| 2,323,710 | Erickson | July 6, 1943 |
| 2,346,969 | Jenck | Apr. 18, 1944 |
| 2,415,827 | Lee | Feb. 18, 1947 |

OTHER REFERENCES

Wolfe, "Printing and Litho Inks," (1933), pages 45 and 46.

Grempe, "Farber Zeitung," 26 (1915), pages 322 and 323.